(12) United States Patent
Shaffer et al.

(10) Patent No.: US 8,583,978 B2
(45) Date of Patent: Nov. 12, 2013

(54) MULTICAST MESSAGE RETRANSMISSION

(75) Inventors: Shmuel Shaffer, Palo Alto, CA (US); Jean-Philippe Vasseur, Saint Martin d'Uriage (FR); Sandeep Jay Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 345 days.

(21) Appl. No.: 12/942,977

(22) Filed: Nov. 9, 2010

(65) Prior Publication Data

US 2012/0117438 A1    May 10, 2012

(51) Int. Cl.
*G06F 11/00* (2006.01)
(52) U.S. Cl.
USPC .......................................................... 714/749
(58) Field of Classification Search
USPC ........................... 714/748–750, 818, 819, 821
See application file for complete search history.

(56) References Cited

U.S. PATENT DOCUMENTS

| | | | | |
|---|---|---|---|---|
| 5,959,989 A | * | 9/1999 | Gleeson et al. | 370/390 |
| 6,223,286 B1 | * | 4/2001 | Hashimoto | 713/178 |
| 6,505,253 B1 | * | 1/2003 | Chiu et al. | 709/235 |
| 6,907,011 B1 | * | 6/2005 | Miller et al. | 370/254 |
| 7,095,739 B2 | * | 8/2006 | Mamillapalli et al. | 370/390 |
| 7,996,553 B2 | * | 8/2011 | Keller et al. | 709/232 |
| 2006/0271645 A1 | * | 11/2006 | Theimer et al. | 709/218 |
| 2008/0310414 A1 | * | 12/2008 | Yonge et al. | 370/390 |
| 2012/0113986 A1 | * | 5/2012 | Shaffer et al. | 370/390 |

* cited by examiner

*Primary Examiner* — Nadeem Iqbal
(74) *Attorney, Agent, or Firm* — Fish & Richardson P.C.

(57) ABSTRACT

In one implementation, a method of distributing a multicast message in a wireless mesh network includes receiving a multicast message from a parent node of an intermediate node. The method includes transmitting the multicast message to child nodes of the intermediate node. The method includes storing the multicast message in a cache at the intermediate node. The method includes intercepting an acknowledgement message from each acknowledging child node within an acknowledging subset of less than all of the child nodes. The method includes accessing information indicating a population of the child nodes to which the multicast message transmission was directed. The method includes comparing the acknowledging subset of the child nodes with the population of the child nodes. The method includes identifying a non-acknowledging subset of less than all of the child nodes. The method includes retransmitting the multicast message to the non-acknowledging subset of the child nodes.

29 Claims, 6 Drawing Sheets

```
CONFIGURATION_FILE_FOR_WIRELESS_MESH_NODE

CHILD_NODES          ACK_RECEIVED   DEPTH
NODE_1   ADDRESS_A   N              1
NODE_2   ADDRESS_B   Y              1
NODE_3   ADDRESS_C   Y              2
NODE_4   ADDRESS_D   Y              2
NODE_5   ADDRESS_E   N              3

CACHE: Y (IF_NO_ACK_RECEIVED)
RETRANSMIT_CONFIGURATION:
DEPTH<3 THEN TRANSMIT MULTICAST MESSAGE
DEPTH >= 3 THEN TRANSMIT UNICAST MESSAGE

CACHE_DOWNSTREAM_STATUS:
YES IF_DEPTH>6
                                        400
```

FIG. 4

MULTICAST MESSAGE RETRANSMISSION

RELATED APPLICATION

The present disclosure is related to commonly-owned, copending U.S. patent application Ser. No. 12/942,985, entitled "A SYSTEM AND METHOD FOR MANAGING ACKNOWLEDGMENT MESSAGES IN A VERY LARGE COMPUTER NETWORK," which was filed by Shaffer et al. on even date herewith.

TECHNICAL FIELD

The present disclosure relates to multicast message retransmission in a computer network that can be represented by a directed acyclic graph (DAG), such as in a Low power and Lossy Network (LLN).

BACKGROUND

Low power and Lossy Networks (LLNs), e.g., sensor networks, have many applications, such as Smart Grid and Smart Cities. These Networks are often the subject of various configuration issues. Examples include lossy links, low bandwidth, battery operation, low memory and/or processing capability, etc. One example routing solution to LLN configuration issues is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DAG discovery, construction, and maintenance.

One feature of LLNs is scalability of the networks, since DAGs can be relatively small (e.g., hundreds of nodes) or extremely large (e.g., millions of nodes). Currently, scalability is enhanced in RPL by limiting control plane traffic using dynamic timers (known as Trickle-based timers), which reduce the load associated with control plane traffic by limiting that traffic to instances that are believed necessary. Another enhancement to scalability is achieved through threshold-based reporting (e.g., metric smoothing). Yet, further enhancements are desirable, particularly since, many operations nevertheless require action by the entire DAG, such as a complete rebuild of the DAG (global repair), which is an expensive operation for such networks. In addition, some of these actions in certain networks, such as those meant to carry sensitive traffic (e.g., alarms), may require frequent global operations.

BRIEF DESCRIPTION OF THE DRAWINGS

The implementations herein may be better understood by referring to the following description in conjunction with the accompanying drawings in which like reference numerals indicate identically or functionally similar elements, of which:

FIG. 4 illustrates an example of a configuration file for distributing a multicast message.

DETAILED DESCRIPTION

Overview

Figure 1:
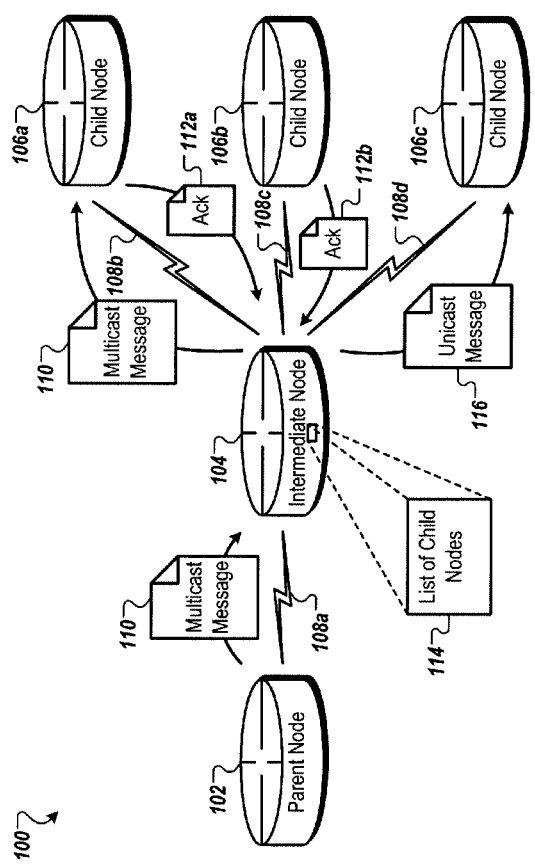
FIG. 1 illustrates an example computer network for distributing a multicast message.

In one aspect, a method of distributing a multicast message includes receiving, at an intermediate node in a multicast network, a multicast message from a parent node of the intermediate node. In some implementations, the multicast network can be represented as a directed acyclic graph and the parent node is located closer to a root node of the directed acyclic graph than the intermediate node. The method further includes transmitting the multicast message to child nodes of the intermediate node in the multicast network. The child nodes are located further from the root node of the directed acyclic graph than the intermediate node. The multicast message may be stored in a cache at the intermediate node. An acknowledgement message is received that travels in the upward direction (from the child to the DAG root), at the intermediate node in the multicast network, from each acknowledging child node in an acknowledging subset of less than all of the child nodes of the intermediate node. The acknowledgement message indicates that the acknowledging child node successfully received the multicast message. Information indicating a population of the child nodes to which the multicast message transmission was directed may be accessed. The acknowledging subset of the child nodes revealed by the acknowledgement messages may be compared with the population of the child nodes to which the multicast message transmission was directed.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, WPC and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network consisting of spatially distributed autonomous devices such as sensors, actuators, etc., that cooperatively monitor physical or environmental conditions at different locations, such as, e.g., energy/power consumption, resource consumption (e.g., water/gas/etc.) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data, along with routing/relaying data from other sensors, to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers, such as alarm messages. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram that shows an example of a computer network 100. In some implementations, the computer network 100 can be represented as a directed acyclic graph (DAG). The computer network 100 includes multiple nodes/devices, such as a parent node 102, an intermediate node 104, and multiple child nodes 106a-c. The nodes are interconnected by links 108a-d that can use various methods of communication. For instance, the links 108a-d (such as Ethernet or Power Line Communications,) may be wired links or may comprise a wireless communication medium, where certain nodes, such as, e.g., routers, sensors, computers, etc., may be in communication with other nodes, e.g., based on distance, signal strength, current operational status, location, etc. Those skilled in the art will understand that any number of nodes, devices, links, etc. may be used in the computer network, and that the view shown herein is for simplicity. Also, while the implementations are shown herein with reference to a generally "tree" shaped network, the description herein is not so limited, and may be applied to networks that have branches emitting to all directions from with the root node generally centralized among a plurality of surrounding nodes.

Illustratively, certain devices in the network may be more capable than others, such as those devices having larger memories, sustainable non-battery power supplies, etc., versus those devices having minimal memory, battery power, etc. For instance certain devices may have no or limited memory capability. Also, one or more of the nodes may be considered "root nodes/devices" (or root capable devices), also referred to as LLN border routers (LBRs), while one or more of the devices may also be considered "destination nodes/devices."

Data packets, such as a multicast message 110, sent between the devices/nodes may be exchanged using predefined network communication protocols such as the Transmission Control Protocol/Internet Protocol (TCP/IP), User Datagram Protocol (UDP), Multi-Protocol Label Switching (MPLS), and/or various proprietary protocols, etc. In this context, a protocol consists of a set of rules defining how the nodes interact with each other. In addition, packets within the computer network 100 may be transmitted in a different manner depending upon device capabilities, such as source routed packets.

The nodes in the computer network 100 may communicate with other nodes through wired or wireless communication channels according to a routing table or list of nodes stored in each node. The routing table can include, but is not limited to, addressing information for a node's parent node, a list of immediate child nodes, a list of all ancestor nodes, a list of all offspring nodes, and a list of sibling nodes. The routing table can be used by a node when the relationship is known. For example, the parent node 102 may generate the multicast message 110 for the child nodes 106a-c by sending the multicast message using a multicast tree. Alternatively, the parent node may look up the multicast addresses used for the child nodes 106a-c in the routing table stored at the parent node 102. As such, message recipients may be described in terms of node relationships, and the addresses for those relationships may be resolved by a node that sends a message. Note that the multicast message may be source routed. That is, a header in the packet indicates the path that the multicast message must follow. For example, this path may be computed by the DAG root.

Figure 2:
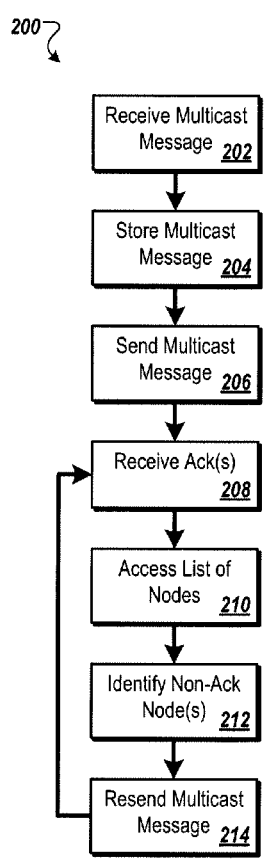
FIG. 2 illustrates an example of distributing a multicast message.

FIG. 2 is a flow chart that shows an example of a process 200 for distributing a multicast message. The process 200 begins with a node, such as the intermediate node 104, receiving (202) a multicast message. The multicast message is a message intended for receipt by multiple and/or all nodes in a network, such as the computer network 100. If the node is identified as a caching node for the multicast message, then the node stores or caches (204) the multicast message.

The node sends (206) the multicast message to multiple child nodes, such as the child nodes 106a-c. The child nodes, and accordingly the subset of the child nodes, can include immediate children of the node and/or subsequent children that separated from the node by one or more additional nodes and interconnections. For example, the intermediate node 104 can send the multicast message 110 to the child nodes 106a-c through the interconnections 108b-d. Note that if this is a wireless link, then the node may transmit the packet once; furthermore the packet may continue to be transmitted to the other child of these nodes.

The node receives (208) an acknowledgement from each of a subset of the child nodes, even if the acknowledgment is destined to the originator of the multicast packet; in that sense the ACK message is intercepted by the intermediate storing node. For example, the node may expect to receive an ACK from its children and also from additional nodes such as grand-children (a node that is more than one link away). In one configuration, a node may be configured to expect the number of ACKs expected as being equal to its number of children. Furthermore, some children may not be part of a multicast distribution tree. That is, if a node A has three children (B, C and D) and B and D belongs to the same multicast distribution tree, the message is sent via multicast to B and D only. If B and D each have two children (E, F) and (G, H), respectively, that should receive the ACK, the total number of ACK that node A expect to receive is 6 (B, D, E, F, G, H). The subset of the child nodes that sent acknowledgements can include, for example, less than all of the child nodes, such as some, a few, or none of the child nodes. The acknowledgements indicate that the child nodes in the subset successfully received the multicast message. For example, the intermediate node 104 can receive an acknowledgment 112a from the child node 106a and an acknowledgement 112b from the child node 106b.

The node accesses (210) a routing table or list of child nodes. The routing table/list of child nodes includes a list of child nodes to which the multicast message was directed. For example, the routing table/list of child nodes can include a list of child nodes 114 (immediate and/or subsequent) that are currently being served by the intermediate node 104 in the computer network 100. The list of child nodes 114 can include children of the intermediate node 104 and/or subsequent children that separated from the intermediate node 104 by one or more additional nodes and interconnections. In some implementations, the list of child nodes 114 includes children of the intermediate node 104 along one or more paths in the DAG up to a next node in each of one or more of the paths that is also designated as a multicast message caching node.

In some implementations, where subsequent child nodes are served by a next caching node, the list of child nodes 114 can include an indication of the number of subsequent child nodes served by the next caching node. In some implementations, the next caching node reports of number of acknowledging subsequent child nodes to the intermediate node 104. The intermediate node 104 can then aggregate the number of acknowledging child nodes from one or more next caching nodes with a number of acknowledging child nodes of the intermediate node 104. The intermediate node 104 then reports the aggregated number of acknowledging child nodes to the parent node 102.

That is, the intermediate node 104 can determine how many ACK are expected. The intermediate node 104 inspects the packet to determine if the packet that was transmitted in the UP direction corresponds to an ACK for a multicast packet that is sent downward. This may require realized by having the intermediate node 104 buffer a copy of the original multicast packet and perform Deep Packet Inspection, where the router does not only route the packet but analyses the packet content.

The node identifies (212) a subset of the child nodes from which the node did not receive an acknowledgment for the multicast message. Note that the node need not be the destination of the acknowledgment. Rather, the node may lie upon the path to the destination so that the node may "perceive" the packet after having inspected the acknowledgement but the destination of the acknowledgement need not represent the address of the node. The subset of the child nodes from which acknowledgements were not received can include, for example, one or more of the child nodes. The identification is based on the subset of the child nodes that sent acknowledgements and the list of child nodes to which the multicast message was directed. For example, the intermediate node 104 can compare the subset of the child nodes from which acknowledgement were received (i.e., the acknowledging child nodes) to the list of child nodes 114 to determine the subset of the child nodes from which acknowledgments have not been received (i.e., the non-acknowledging child nodes).

In some implementations, the intermediate node 104 waits for a threshold amount of time before comparing the acknowledging child nodes to the list of child nodes 114. The duration of period of time may be proportional to the number of expected ACKs. In accordance with yet another implementation, the duration period may be proportional to the depth of the furthest child node from the intermediate node.

The node retransmits (214) the stored multicast message to the identified subset of the child nodes from which the node did not receive an acknowledgment for the multicast message. For example, the intermediate node 104 (in place of the original source of the multicast message) can retransmit the multicast message 110 to the child node 106c. Alternatively or in addition, the intermediate node 104 can retransmit the multicast message 110 as a unicast message. For example, the intermediate node 104 can determine that the number of non-acknowledging nodes is less than a threshold number. In response to the determination, the intermediate node 104 can retransmit the multicast message 110 as individual unicast messages to the non-acknowledging nodes. In another example, the intermediate node 104 can determine that the number of non-acknowledging nodes is greater than a threshold number. In response to the determination, the intermediate node 104 can retransmit the multicast message 110 again as a multicast message to the non-acknowledging nodes. In some implementations, the intermediate node 104 can retransmit the multicast message 110 as both a multicast message and one or more unicast messages. For example, the intermediate node 104 can retransmit the multicast message 110 as a multicast message to a group or a particular subnet of the non-acknowledging nodes and as a unicast message to the non-acknowledging nodes that are not in the group or subnet.

The node can repeat one or more of the steps of receiving (208) acknowledgements, accessing (210) the list of child nodes (i.e., a list of nodes for which an acknowledgment is expected that also may include "grandchild" nodes and beyond), identifying (212) non-acknowledging child nodes, and/or retransmitting (214) the stored multicast message. For example, the intermediate node 104 can wait for a threshold amount of time after retransmitting the multicast message. The intermediate node 104 can then perform the steps of receiving (208) acknowledgments, identifying (212) non-acknowledging child nodes, and retransmitting (214) the stored multicast message. In some implementations, the intermediate node 104 only performs the step of retransmitting (214) the stored multicast message a particular number of times and/or performs the step of retransmitting (214) the stored multicast message a particular number of times before reporting the results of the multicast transmission to the parent node 102 (e.g., a number of acknowledging child nodes and/or an indication of specific child nodes from which acknowledgments were not received).

Figure 3:
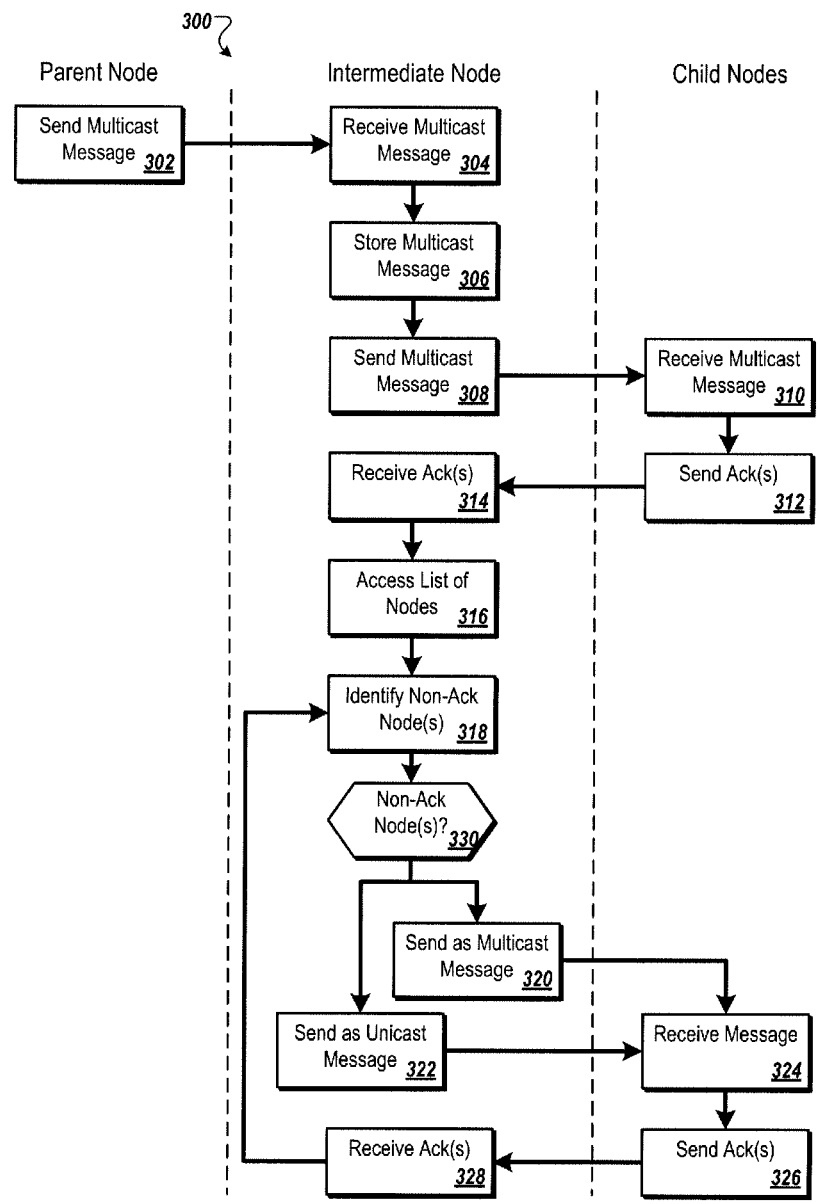
FIG. 3 illustrates an example of distributing a multicast message.

FIG. 3 is a flow chart that shows an example of a process 300 for distributing a multicast message from a parent node, through an intermediate node, and to multiple child nodes. The process 300 beings with a parent node, such as the parent node 102, sending (302) a multicast message over a LLN. An intermediate node, such as the intermediate node 104, receives (304) the multicast message and stores (306) the multicast message in a cache at the intermediate node.

In some implementations, the intermediate node (and each node along the multicast distribution path) automatically stores the multicast message. Alternatively, in some implementations, the intermediate node stores the multicast message in response to one or more events. For example, if the intermediate node determines that the multicast message is a critical message (e.g., a message that includes an indicator that represents a high level importance), then in response, the intermediate node can store the multicast message.

In another example, the parent node can include a cache indicator in the multicast message sent to the intermediate node. The intermediate node then determines, based on the cache indicator received in the multicast message, that the multicast message should be stored.

In another example, the parent node can transmit a cache message separate from the multicast message to the intermediate node, or alternatively specify the requirement to cache the message on a specific node in a specific field of the multicast message. The intermediate node then determines, based on the received cache message, that the multicast message should be stored. In some implementations, the parent node sends the cache message once and the intermediate node stores the information from the cache message for use in determining the caching of multiple subsequent multicast messages.

In another example, the intermediate node can determine that it is a threshold number of nodes away from the parent node and, in response, the intermediate node stores the multicast message. In some implementations, the threshold number of nodes from the parent node can be based on a number of nodes from the intermediate node the root node. For example, the node distance between caching nodes may be greater near the root node (e.g., every five nodes) and closer away from the root node (e.g., every one node). In some implementations, this can further reduce a number of network collisions that result from the retransmission of multicast messages.

The intermediate node transmits (308) the multicast message to child nodes of the intermediate node in the multicast network. A number of the child nodes that is less than all of the child nodes each receive (310) the multicast message and transmit (312) an acknowledgement message to the intermediate node. The acknowledgement message indicates that the respective child node successfully received the multicast message.

The intermediate node receives (314) the acknowledgements from the acknowledging child nodes. Note that the child nodes may include child nodes with a depth of greater than one from the intermediate node (e.g., a grandchild). The intermediate node accesses (316) information indicating a population of the child nodes to which the multicast message transmission was directed. The intermediate node compares the acknowledging subset of the child nodes revealed by the acknowledgement messages with the population of the child nodes to which the multicast message transmission was directed and identifies (318). The comparison is based on results of the comparison between the acknowledging subset of the child nodes revealed by the acknowledgement messages with the population of the child nodes to which the multicast message transmission was directed, a non-acknowledging subset of the child nodes that includes at least one of the child nodes.

The intermediate node retransmits, from the cache at the intermediate node, the multicast message to the non-acknowledging subset of the child nodes. In some implementations, the intermediate node retransmits (320) the multicast message again as a multicast message. In some implementations, the intermediate node retransmits (322) the multicast message as a unicast message. In some implementations, the intermediate node performs both of retransmitting (320) the multicast message again as a multicast message and retransmitting (322) the multicast message as a unicast message.

A number of the non-acknowledging subset of the child nodes receive (324) the retransmitted multicast message and transmit (326) corresponding acknowledgments back to the intermediate node on its way to the source of the multicast message. The intermediate node receives (328) the acknowledgements and again compares the acknowledging child nodes to the population of the child nodes (or to the remainder of the non-acknowledging child nodes) to identify (318) the current set of non-acknowledging child nodes. If one or more non-acknowledging child nodes remain (330), then the intermediate node can retransmit the message again as a unicast or a multicast message. In some implementations, the intermediate node only retransmits the multicast message a maximum number of times.

Note that that the message volume closer to the root is likely greater than the message flow close to the edge of the network. As a result of the greater volume of messages, the increased number of potential collisions over links and adverse network performance, nodes closer to the root may receive enough broadcast/multicast/unicast retransmits from sibling nodes in order to have greater success rate in receiving the original broadcast/multicast/unicast message. In order to minimize the retransmission of broadcast/multicast/unicast messages via links close to the root (as these may result in greater congestion in an already high message traffic portion of the DAG topology), intermediate nodes may be relied upon within the network to act as proxy for the root node (or for the application in the headend) and carry on the retransmission process without overburdening the links close to the DAG root with repeating the broadcast messages.

Through the use of several examples that follow, technologies are described that are applicable to various LLN configurations (e.g., wireless, wireless mesh, and/or Power Line Communications (PLC)). FIG. 4 is an example of a configuration file 400 for a node, such as the intermediate node 104, in a wireless mesh computer network. In some implementations, the configuration file 400 is stored at the node. The configuration file 400 includes a list of the child nodes for the node. The list includes a name for each child node (e.g., NODE_1, NODE_2, NODE_3, NODE_4, and NODE_5). The list also includes an address for each child node (e.g., ADDRESS_A, ADDRESS_B, ADDRESS_C, ADDRESS_D, and ADDRESS_E).

In some implementations, an address can be represented as a hostname on a local network and/or as a domain name in a larger network. In some implementations, an address can be represented as an Internet Protocol (IP) address format, such as IP version 4 (IPv4), IP version 6 (IPv6), or a proprietary addressing schema. The configuration file 400 also indicates a depth of each of the child nodes. The depth can indicate, for example, a number of nodes that separate the child node from the intermediate node and/or a number of nodes that separate the child node from a root node of the LLN (e.g., a wireless mesh network).

In some implementations, the intermediate node can use the configuration file 400 to store the status of the last multicast message sent to the child nodes. For example, the configuration file 400 can indicate whether an acknowledgement was received from each of the child nodes in response to transmitting the multicast message to the child nodes. The configuration file 400 indicates that acknowledgements (ACKs) were received from NODE_2, NODE_3, and NODE_4, but not from NODE_1 and NODE_5. Alternatively, acknowledgments can be stored in a file separate from the configuration file 400 and/or in a non-persistent memory.

The configuration file 400 indicates that the intermediate node is configured to cache multicast messages in the event that an acknowledgment is not received from one or more of the child nodes (e.g., CACHE: Y). The configuration file 400 also indicates that the intermediate node is configured to retransmit the multicast message again as another multicast message for non-acknowledging child nodes that have a depth of less than three (e.g., DEPTH<3 . . . ). For example, if the intermediate node does not receive acknowledgments from NODE_1 and NODE_2 in response to transmitting a multicast message, then the intermediate node retransmits the multicast message to NODE _1 and NODE_2 again as a multicast message. The configuration file 400 further indicates (e.g., DEPTH>=3 . . . ) that the intermediate node is configured to retransmit the multicast message as one or more unicast messages for non-acknowledging child nodes that have a depth of three or more. For example, if the intermediate node does not receive acknowledgments from child nodes with depths of three and four in response to transmitting a multicast message, then the intermediate node retransmits the multicast message as a first unicast message to the depth three child nodes and as a second unicast message to the depth four child node. The configuration file 400 also indicates that the intermediate node caches the message for each child node with a depth of more than six (e.g., DEPTH>6).

Figure 5:
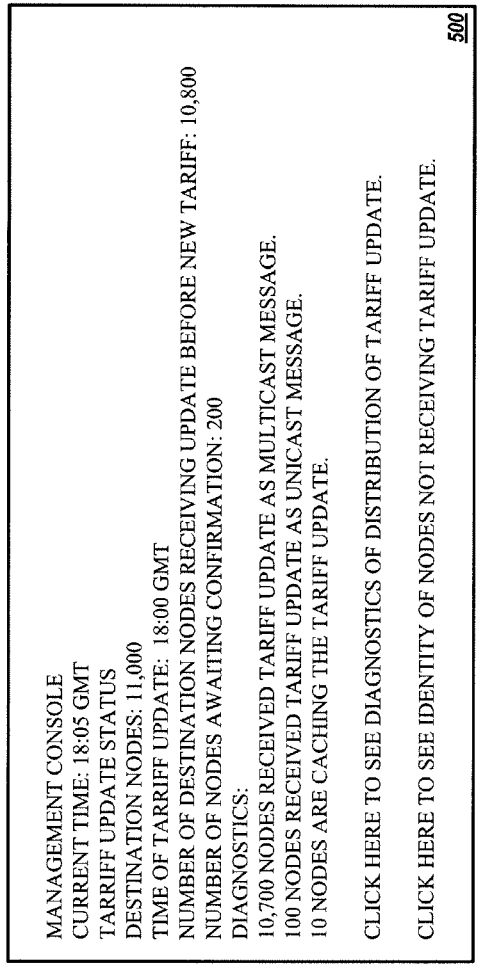
FIG. 5 illustrates an example of a user interface for identifying an outage in a wireless mesh network for distributing a multicast message.

FIG. 5 is an example of a user interface 500 for identifying an outage in a wireless mesh network. The wireless mesh network is used for distributing one or more multicast messages, such as a "TARRIFF UPDATE." The user interface 500 illustrates how routing and network information may be used to present a comprehensive picture. The user interface 500 indicates a total number of nodes (e.g., 11,000) in the wireless mesh network. The user interface 500 also indicates a number of nodes (e.g., 10,800) that have currently acknowledged the last multicast message and a number of nodes (e.g., 200) that have not yet acknowledged the last multicast message. Further, the user interface 500 indicates a number of acknowledging nodes (e.g., 10,700) that received the multicast message as a multicast message and a number of acknowledging nodes (e.g., 100) that received the multicast message as a unicast message. The user interface 500 further shows a number of nodes (e.g., 10) that are currently caching the multicast message. In this manner, an administrator can perceive the impact of supporting multicast messages on a network.

Figure 6:
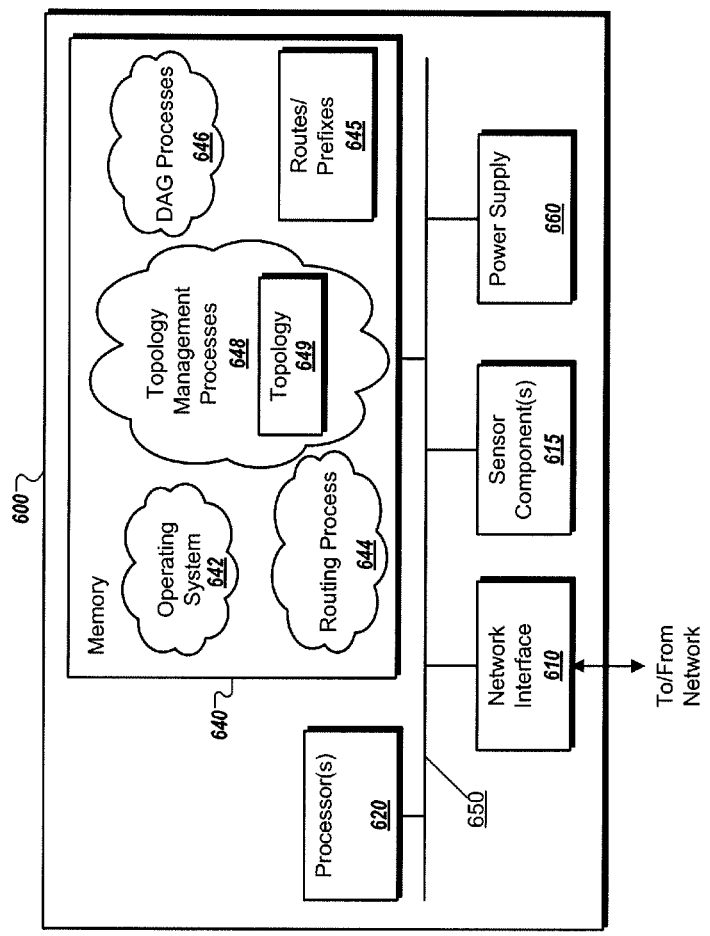
FIG. 6 illustrates an example of a network device/node for distributing a multicast message.

FIG. 6 is a schematic block diagram of an example node/device 600 that may be used with one or more implementations described herein, e.g., as a root node or other node (e.g., sensor) in the network. The device may comprise one or more network interfaces 610, one or more sensor components 615 (e.g., sensors, actuators, etc.), a processor 620 (e.g., an 8-64 bit microcontroller), and a memory 640 interconnected by a system bus 650, as well as a power supply 660 (e.g., battery, plug-in, etc.).

The network interface(s) 610 contain the mechanical, electrical, and signaling circuitry for communicating data over physical and/or wireless links coupled to the computer network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®,), Ethernet, powerline communication (PLC) protocols, etc. Note that the root may have two different types of network connections 610. Namely, one or more interfaces may be used to communicate with the mesh network, i.e., the other nodes shown in FIG. 1, while another interface is used as a WAN uplink network interface between the root node and, for example, a head-end device located through the WAN.

The memory 640 comprises a plurality of storage locations that are addressable by the processor(s) 620 and the network interfaces 610 for storing software programs and data structures associated with the implementations described herein. As noted above, certain devices may have limited memory or no memory (e.g., no memory for storage other than for programs/processes operating on the device). The processors 620 may comprise necessary elements or logic adapted to execute the software programs and manipulate the data structures, such as routes or prefixes 645 (notably on capable devices only). An operating system 642, portions of which are typically resident in memory 640 and executed by the processor(s), functionally organizes the device by, inter alia, invoking operations in support of software processes and/or services executing on the device. These software processes and/or services may comprise routing process/services 644, which may include an illustrative directed acyclic graph (DAG) process 646. Also, for root devices (or other management devices), a topology management process 648 and associated stored topologies 649 may also be present in memory 640, for use as described herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 644 contains computer executable instructions executed by the processor 620 to perform functions provided by one or more routing protocols, such as proactive or reactive routing protocols as will be understood by those skilled in the art. These functions may, on capable devices, be configured to manage a routing/forwarding table 645 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 644 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be to used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes;

6) Nodes may be constrained with a low memory, a reduced processing capability, a low power supply (e.g., battery); and 7) Nodes may be more densely packed near the root node than at the periphery of the network. Accordingly collisions may occur more frequently near the root node than at the periphery of the network.

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-15> by Winter, at al. (Nov. 6, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph having the property that all edges are oriented in such a way that no cycles (loops) exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is a successor of the particular node on a path towards the DAG root, such that the parent has a lower "rank" than the particular node itself, where the rank of a node identifies the node's position with respect to a DAG root (e.g., the farther away a node is from a root, the higher is the rank of that node). A parent may have an immediate interconnection with the particular node or a subsequent interconnection through one or more additional nodes. A "child" of a particular node within a DAG is a node on a path from the particular node in the direction away from the DAG root, such that the child has a higher "rank" than the particular node itself. A child may have an immediate interconnection with the particular node or a subsequent interconnection through one or more additional nodes. Further, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as where if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-11> by Vasseur, et al. (Oct. 23, 2010 version). Further, an example OF (e.g., a default OF) may be found in an IETF Internet Draft, entitled "RPL Objective Function 0" <draft-ietf-roll-of0-03> by Thubert (Jul. 29, 2010 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

While there have been shown and described illustrative implementations that manage DAGs in a computer network, it is to be understood that various other adaptations and modifications may be made within the spirit and scope of the implementations herein. For example, the implementations have been shown and described herein with relation to LLNs, and more particular, to the RPL protocol. However, the implementations in their broader sense are not so limited, and may, in fact, be used with other types of networks and/or protocols utilizing DAG routing (e.g., distance vector protocols).

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method of distributing a multicast message in a Low power and Lossy Networks (LLN), the method comprising:
    receiving, at an intermediate node in a multicast network, a multicast message from a parent node of the intermediate node, wherein the multicast network is a directed acyclic graph and the parent node is located closer to a root node of the directed acyclic graph than the intermediate node;
    transmitting the multicast message to child nodes of the intermediate node in the multicast network, wherein the child nodes are located further from the root node of the directed acyclic graph than the intermediate node;
    storing the multicast message in a cache at the intermediate node;
    receiving, at the intermediate node in the multicast network, an acknowledgement message from each acknowledging child node within an acknowledging subset of less than all of the child nodes of the intermediate node, wherein the acknowledgement message indicates that the acknowledging child node successfully received the multicast message;
    accessing information indicating a population of the child nodes to which the multicast message transmission was directed;
    comparing the acknowledging subset of the child nodes revealed by the acknowledgement messages with the population of the child nodes to which the multicast message transmission was directed;
    identifying, based on results of the comparison between the acknowledging subset of the child nodes revealed by the acknowledgement messages with the population of the child nodes to which the multicast message transmission was directed, a non-acknowledging subset of less than all of the child nodes; and
    retransmitting, from the cache at the intermediate node, the multicast message to the non-acknowledging subset of the child nodes.

2. The method of claim 1, further comprising:
    receiving, at the intermediate node, a cache indicator in the multicast message;
    determining, based on the received cache indicator, that the multicast message should be stored in the cache; and
    wherein the storing of the multicast message in the cache at the intermediate node occurs in response to determining that the multicast message should be stored in the cache.

3. The method of claim 1, further comprising:
    receiving, at the intermediate node, a cache message that is separate from the multicast message;
    determining, based on the received cache message, that the multicast message should be stored in the cache; and
    wherein the storing of the multicast message in the cache at the intermediate node occurs in response to determining that the multicast message should be stored in the cache.

4. The method of claim 1, further comprising:
    determining that the intermediate node is at least a threshold number of nodes away from the parent node; and
    wherein the storing of the multicast message in the cache at the intermediate node occurs in response to determining that the intermediate node is at least the threshold number of nodes away from the parent node.

5. The method of claim 4, wherein the threshold number of nodes is based on a proximity of the intermediate node to the root node of the multicast network.

6. The method of claim 1, further comprising:
    determining that the multicast message is a critical message; and
    wherein the storing of the multicast message in the cache at the intermediate node occurs in response to determining that the multicast message is a critical message.

7. The method of claim 1, wherein the storing of the multicast message in the cache at the intermediate node occurs automatically along a multicast distribution path.

8. The method of claim 1, wherein retransmitting the multicast message to the non-acknowledging subset of the child nodes includes transmitting the multicast message as a unicast message.

9. The method of claim 1, wherein retransmitting the multicast message to the non-acknowledging subset of the child nodes includes retransmitting the multicast message to only those portions of the multicast network for which an acknowledgement message has not been received.

10. The method of claim 1, further comprising:
    configuring the intermediate node to be a caching node, and
    storing the multicast message in response to the intermediate node being configured to be a caching node.

11. The method of claim 1 wherein the multicast message is stored for a limited period of time.

12. The method of claim 1 wherein the intermediate node listens for a limited period of time and then generates a report after the expiration of the limited period of time.

13. A system configured to distribute a multicast message in a Low power and Lossy Networks (LLN), the system comprising a processor and instructions that when executed on a processor cause the processor to perform operations that include:

receiving, at an intermediate node in a multicast network, a multicast message from a parent node of the intermediate node, wherein the multicast network is a directed acyclic graph and the parent node is located closer to a root node of the directed acyclic graph than the intermediate node;

transmitting the multicast message to child nodes of the intermediate node in the multicast network, wherein the child nodes are located further from the root node of the directed acyclic graph than the intermediate node; storing the multicast message in a cache at the intermediate node;

receiving, at the intermediate node in the multicast network, an acknowledgement message from each acknowledging child node within an acknowledging subset of less than all of the child nodes of the intermediate node, wherein the acknowledgement message indicates that the acknowledging child node successfully received the multicast message;

accessing intermediate indicating a population of the child nodes to which the multicast message transmission was directed;

comparing the acknowledging subset of the child nodes revealed by the acknowledgement messages with the population of the child nodes to which the multicast message transmission was directed;

identifying, based on results of the comparison between the acknowledging subset of the child nodes revealed by the acknowledgement messages with the population of the child nodes to which the multicast message transmission was directed, a non-acknowledging subset of less than all of the child nodes; and retransmitting, from the cache at the intermediate node, the multicast message to the non-acknowledging subset of the child nodes.

14. The system of claim 13, further comprising instructions that include:

receiving, at the intermediate node, a cache indicator in the multicast message;

determining, based on the received cache indicator, that the multicast message should be stored in the cache; and wherein the storing of the multicast message in the cache at the intermediate node occurs in response to determining that the multicast message should be stored in the cache.

15. The system of claim 13, further comprising instructions that include:

receiving, at the intermediate node, a cache message that is separate from the multicast message;

determining, based on the received cache message, that the multicast message should be stored in the cache; and wherein the storing of the multicast message in the cache at the intermediate node occurs in response to determining that the multicast message should be stored in the cache.

16. The system of claim 13, further comprising instructions that include:

determining that the intermediate node is at least a threshold number of nodes away from the parent node; and wherein the storing of the multicast message in the cache at the intermediate node occurs in response to determining that the intermediate node is at least the threshold number of nodes away from the parent node.

17. The system of claim 16, wherein the threshold number of nodes is based on a proximity of the intermediate node to the root node of the multicast network.

18. The system of claim 13, further comprising instructions that include:

determining that the multicast message is a critical message; and wherein the storing of the multicast message in the cache at the intermediate node occurs in response to determining that the multicast message is a critical message.

19. The system of claim 13, wherein the storing of the multicast message in the cache at the intermediate node occurs automatically along a multicast distribution path.

20. The system of claim 13, wherein retransmitting the multicast message to the non-acknowledging subset of the child nodes includes transmitting the multicast message as a unicast message.

21. The system of claim 13, wherein retransmitting the multicast message to the non-acknowledging subset of the child nodes includes retransmitting the multicast message to only those portions of the multicast network for which an acknowledgement message has not been received.

22. The system of claim 13, further comprising instructions that include:

configuring the intermediate node to be a caching node, and storing the multicast message in response to the intermediate node being configured to be a caching node.

23. The system of claim 13 wherein the multicast message is stored for a limited period of time.

24. The system of claim 13 wherein the intermediate node listens for a limited period of time and then generates a report after the expiration of the limited period of time.

25. A computer program on a non-transitory computer readable storage medium to distribute a multicast message in a Low power and Lossy Networks (LLN), the computer program comprising instructions that when executed on a processor cause the processor to perform operations that include:

receiving, at an intermediate node in a multicast network, a multicast message from a parent node of the intermediate node, wherein the multicast network is a directed acyclic graph and the parent node is located closer to a root node of the directed acyclic graph than the intermediate node;

transmitting the multicast message to child nodes of the intermediate node in the multicast network, wherein the child nodes are located further from the root node of the directed acyclic graph than the intermediate node;

storing the multicast message in a cache at the intermediate node;

receiving, at the intermediate node in the multicast network, an acknowledgement message from each acknowledging child node within an acknowledging subset of less than all of the child nodes of the intermediate node, wherein the acknowledgement message indicates that the acknowledging child node successfully received the multicast message;

accessing information indicating a population of the child nodes to which the multicast message transmission was directed;

comparing the acknowledging subset of the child nodes revealed by the acknowledgement messages with the population of the child nodes to which the multicast message transmission was directed;

identifying, based on results of the comparison between the acknowledging subset of the child nodes revealed by the acknowledgement messages with the population of the child nodes to which the multicast message transmission was directed, a non-acknowledging subset of less than all of the child nodes; and retransmitting, from the cache at the intermediate node, the multicast message to the non-acknowledging subset of the child nodes.

26. A method of distributing a multicast message in a Low power and Lossy Networks (LLN), the method comprising:

analyzing the topology of a LLN based on a directed acyclic graph (DAG) for the LLN, the DAG identifying a number of children and a distance from children to a DAG root;

identifying candidate nodes to becoming store and forward multicasting nodes based on at least the number of the children and the distance from the children to the DAG root; and filtering the candidate nodes based on a relative distance to other candidate nodes within the DAG and a relative distance between a specified candidate node and the DAG root.

27. A system with a processor that distributes a multicast message in a Low power and Lossy Networks (LLN), the system also comprising instructions on a computer readable medium that when executed on a processor cause the processor to perform instructions that include:

analyzing the topology of a LLN based on a directed acyclic graph (DAG) for the LLN, the DAG identifying a number of children and a distance from children to a DAG root;

identifying candidate nodes to becoming store and forward multicasting nodes based on at least the number of the children and the distance from the children to the DAG root; and filtering the candidate nodes based on a relative distance from to other candidate nodes within the DAG and a relative distance between a specified candidate node and the DAG root.

28. A computer program stored on a non-transitory computer readable storage medium comprising instructions that when executed on a processor cause the processor to perform operations that include:

analyzing the topology of a Low power and Lossy Networks (LLN) based on a directed acyclic graph (DAG) for the LLN, the DAG identifying a number of children and a distance from children to a DAG root;

identifying candidate nodes to becoming store and forward multicasting nodes based on at least the number of the children and the distance from the children to the DAG root; and filtering the candidate nodes based on a relative distance from to other candidate nodes within the DAG and a relative distance between a specified candidate node and the DAG root.

29. The method of claim 1 further comprising:

enabling the intermediate node to intercept an acknowledgement message; recording an indication of the acknowledgement message for use in subsequent reporting; and terminating transmission of the acknowledgment messages.

* * * * *

UNITED STATES PATENT AND TRADEMARK OFFICE
CERTIFICATE OF CORRECTION

| | | |
|---|---|---|
| PATENT NO. | : 8,583,978 B2 | Page 1 of 1 |
| APPLICATION NO. | : 12/942977 | |
| DATED | : November 12, 2013 | |
| INVENTOR(S) | : Shaffer et al. | |

It is certified that error appears in the above-identified patent and that said Letters Patent is hereby corrected as shown below:

In the specification

Column 10, line 43, insert:
  --sor networks, may be [[to]] used in a myriad of applications such--

In the claims

Column 15, line 24, claim 13 replace:
  "intermediate" with "information"

Signed and Sealed this
Thirteenth Day of October, 2015

Michelle K. Lee
*Director of the United States Patent and Trademark Office*